Feb. 7, 1967  H. D. OGREN  3,302,466
ACCELEROMETER

Filed April 25, 1963  2 Sheets-Sheet 1

INVENTOR.
HARVEY D. OGREN

BY
ATTORNEY

Feb. 7, 1967 H. D. OGREN 3,302,466
ACCELEROMETER
Filed April 25, 1963 2 Sheets-Sheet 2

INVENTOR.
HARVEY D. OGREN
BY Roger W. Jensen
ATTORNEY

United States Patent Office 3,302,466
Patented Feb. 7, 1967

3,302,466
ACCELEROMETER
Harvey D. Ogren, Roseville, Minn., assignor to
Honeywell Inc., a corporation of Delaware
Filed Apr. 25, 1963, Ser. No. 276,104
6 Claims. (Cl. 73—516)

This invention pertains to accelerometers, and more particularly to fluid accelerometers.

The applicant's invention comprises a unique fluid accelerometer wherein a seismic mass means is loosely received within a cavity and subjected to a continuous flow of fluid through the cavity. The continuous flow of fluid functions to axially position the seismic mass means against a plane surface and to radially center the seismic mass means within the cavity. The applicant's fluid accelerometer is a vast improvement over the prior art in that it provides inertial grade performance at a much higher reliability and much lower cost than presently available accelerometers. This improvement is obtained by utilizing only a single moving element; the seismic mass means. Further, the applicant's accelerometer is suitable for use in extreme thermal environments and is unaffected by nuclear radiation.

It is therefore an object of this invention to provide an improved accelerometer.

This and other objects of the invention will become apparent from a study of the accompanying specification and claims in conjunction with the drawings in which:

Figure 1:
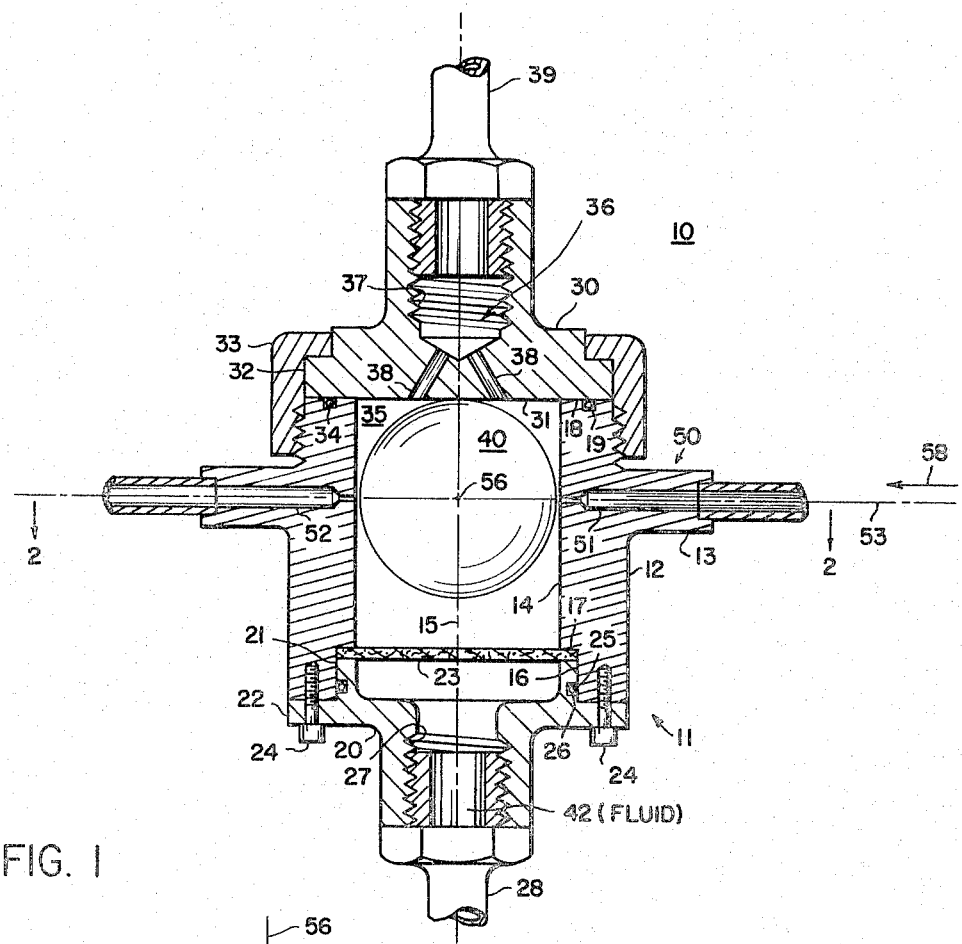
FIGURE 1 is a cross sectional view of the applicant's fluid accelerometer.

Referring now to FIGURE 1, reference numeral 10 generally depicts the applicant's unique accelerometer. A housing means 11 is provided which includes a generally cylindrical central member 12. Central member 12 has an external flange 13 thereon located intermediate the ends thereof. Flange 13 provides a means of mounting housing means 11 and accelerometer 10 upon a vehicle or body so as to measure the acceleration thereof. Central member 12 has a cylindrical bore 14 therethrough which is symmetrical about an axis 15. Member 12 has a bore 16 in one end thereof slightly larger in diameter than bore 14 and is symmetrical about axis 15. Bore 16 has a relatively short axial extent and forms a shoulder 17 adjacent the end of central member 12. The other end of member 12 has an annular end surface 18 thereon which lies in a plane perpendicular to axis 15.

A generally cylindrically shaped end member 20 is provided having an enlarged radius section 21 on one end thereof. End member 20 has a flange portion 22 positioned intermediate enlarged radius section 21 and the other end of end member 20. A sintered metal element 23, having a circular cross section, is positioned within bore 16 abutting shoulder 17 of member 12. Element 23 thus covers one end of bore 14 of member 12. However, element 23 is porous in nature and allows fluid to flow therethrough. The applicant does not wish to be limited to the sintered metal element 23 illustrated in FIGURE 1, other porous materials may be utilized. It is also possible to operate accelerometer 10 without element 23. Enlarged radius section 21 of end member 20 has a diameter slightly smaller than bore 16 of central member 12 so as to fit therein and hold element 23 against shoulder 17. Flange portion 22 of end member 20 abuts against the end of central member 12. A plurality of screws 24 rigidly attach flange 22 and end member 20 to central member 12. An O ring 25 is positioned within an annular groove 26 in enlarged radius section 21 of end member 20 so as to provide a fluid seal between central member 12 and end member 20. End member 20 has a threaded fluid supply passage 27 therethrough. Supply passage 27 is connected to a suitable pressure source (not shown) through a connector means 28.

A second generally cylindrically shaped end member 30 is provided having a plane surface 31 on one end thereof. End member 30 has an enlarged radius section 32 thereon adjacent this one end. End member 30 is positioned across the end of bore 14 so that surface 31 abuts against end surface 18 of member 12. A cup shaped screw cap 33 engages the periphery of section 32 of end member 30 and threadably engages central member 12 so as to rigidly attach end member 30 to central member 12. An O ring 34 is positioned within an annular groove 19 in end surface 18 of central member 12 so as to provide a fluid seal between end member 30 and central member 12. Plane surface 31 thereby covers the other end of bore 14. Thus, housing means 11 including central member 12, end member 20, and end member 30 cooperate to define a cylindrical cavity 35 therebetween which is symmetrical with respect to axis 15. End member 30 has a fluid exhaust passage 36 therein. Fluid exhaust passage 36 includes a threaded axial bore 37 which extends a short axial extent into end member 30. Fluid passage 36 also includes a plurality of small diameter pressure passages 38 which connect bore 37 to cavity 35. Exhaust passage 36 is connected to a suitable fluid exhaust (not shown) through a connector means 39.

A spherically shaped seismic mass means 40 is loosely received in cavity 35. Seismic mass means 40 has a diameter slightly smaller than the diameter of cavity 35. In operation, a fluid 42 under pressure is supplied to supply passage 27. Fluid 42 flows through sintered metal element 18 into cavity 35 and out of exhaust passage 36 thereby providing a continuous flow of fluid through cavity 35, substantially along axis 15. The continuous flow of fluid is effective to axially support seismic mass means 40 in contact with surface 31 of end member 30. Surface 31 of end member 30 and seismic mass means 40 are both heat treated to obtain a hardness sufficient to prevent any deformation thereof upon contact. The continuous flow of fluid 42 through the cavity is also effective to radially center seismic mass means 40 within cavity 35. The fluid flowing around seismic mass 40 exerts a force thereon so as to position seismic mass means 40 in a normal position, wherein its geometric and mass center are located upon axis 15, in the absence of any applied accelerations. Seismic mass means 40 is illustrated in its normal position in FIGURE 1. Thus, supported by the continuous flow of fluid through cavity 35 substantially along axis 15, seismic mass means 40 is sensitive to accelerations applied to accelerometer 10 perpendicular to axis 15.

Figure 2:
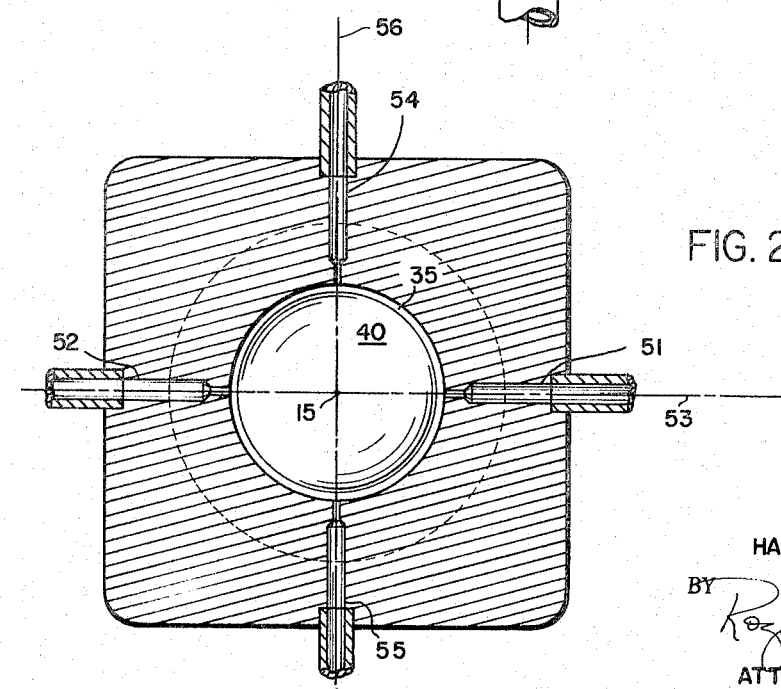
FIGURE 2 is a cross sectional view taken along section line 2—2 of FIGURE 1.

A readout means or error signal producing means 50 is provided within housing means 11 to sense the position of seismic mass means 40 relative to housing means 11. In the embodiment illustrated in FIGURE 1, readout means 50 comprises two pair of pressure sensing ports within central member 12, angularly spaced about axis 15 and in communication with cavity 35. The pressure ports are axially positioned within central member 12 so as to communicate with cavity 35 contiguous the location of the equator (axis 15 being the polar axis) of seismic mass means 40 when it is supported in its normal position as illustrated in FIGURE 1. One pair of pressure sensing ports, 51 and 52, are illustrated in FIGURE 1. Pressure sensing ports 51 and 52 are positioned on opposite sides of bore 14 along an axis 53 which lies within the plane of the drawing (FIGURE 1) and is perpendicular to axis 15. Reference to FIGURE 2 illustrates the other pair of pressure sensing ports, 54 and 55, within central member 12. Pressure sensing ports 54 and 55 are positioned on opposite sides of bore 14 along an axis 56 which is perpendicular to axis 15 and to axis 53. Pressure sensing ports 51 and 52 are connected to a suitable differential pressure sensor (not shown). Pressure ports 54 and 55 are connected to a second suitable pressure differential sensor (not shown). The continuous flow of fluid 42 through cavity 35 axially positions seismic mass 40 against surface 31 and radially centers seismic mass 40 relative to axis 15. The flow of fluid between seismic mass means 40 and housing means 11 creates a fluid pressure therebetween which is sensed by pressure sensing ports 51, 52, 54 and 55.

For purposes of illustration, assume accelerometer 10 is subjected to an acceleration along axis 53, in a direction indicated by arrow 58 in FIGURE 1. Seismic mass means 40 is displaced from its normal position toward pressure sensing port 51 and away from pressure sensing port 52. The displacement of seismic mass means 40 relative to its normal position is opposed by the force exerted thereon by continuous flow of fluid 42, through cavity 35. When the force exerted upon seismic mass means 40 by fluid 42 is equal and opposite to the force thereon due to an applied acceleration, seismic mass means 40 will remain in this position (until the applied acceleration changes). The displacement of seismic mass means 40 toward pressure sensing port 51 results in a pressure increase in pressure sensing port 51 and a pressure decrease in pressure sensing port 52. The pressure increase sensed by pressure port 51 is indicative of the relative displacement between seismic mass means 40 and housing means 11 as seismic mass means 40 is displaced from its normal position upon axis 15. Likewise, the decrease in pressure in pressure sensing port 52 is indicative of the displacement of seismic mass 40 from its normal position. Thus, the differential pressure sensed in the pressure differential sensor (not shown) is indicative of the position of seismic mass means 40 relative to its normal position. The position of seismic mass 40 relative to its normal position is also indicative of the applied acceleration. Consequently, pressure ports 51 and 52 give a pressure differential output signal indicative of the acceleration applied along axis 53. It is clear that a single pressure port may be utilized as a readout means. Output sensing ports 54 and 55 operate in a like manner. Thus, by combining the outputs of each pair of pressure sensing ports an output signal is obtained of an acceleration perpendicular to axis 15. An accelerometer operable to produce such an output signal is generally referred to by those skilled in the art as a two axis accelerometer. Of course, the applicant's accelerometer may be utilized as a single axis instrument by utilizing one pair of pickoff ports or only a single pressure port.

Figure 3:
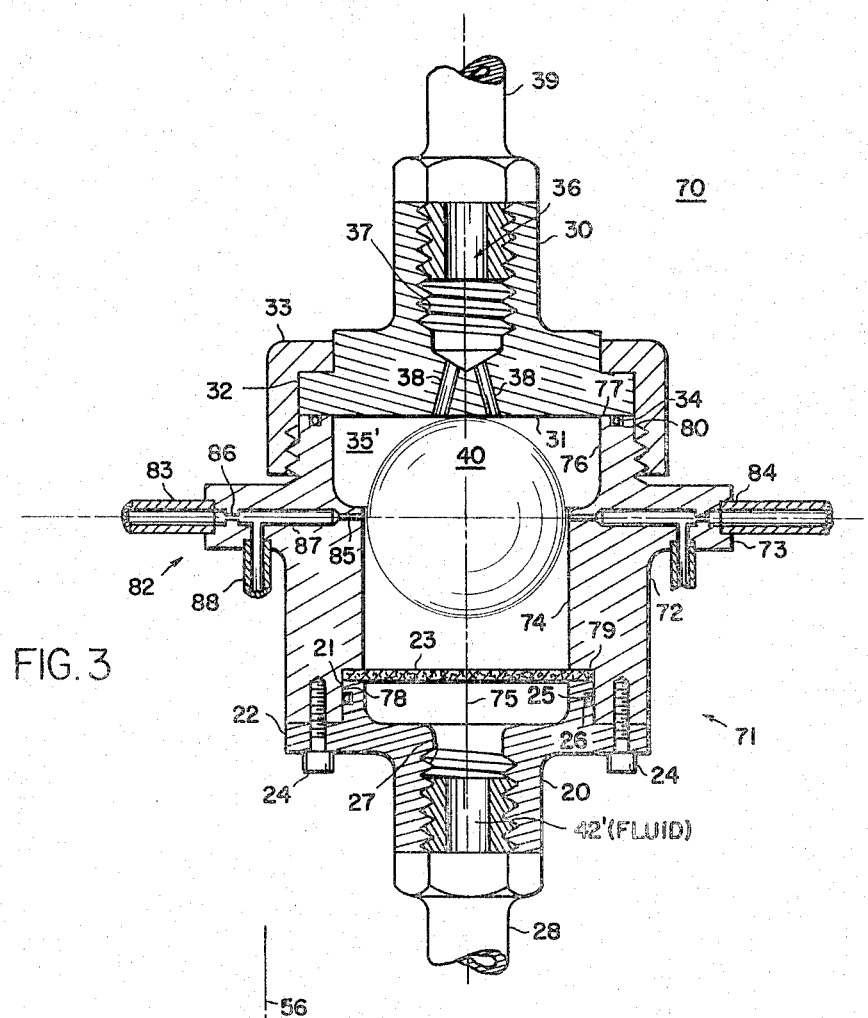
FIGURE 3 is a cross sectional view of an alternate embodiment of the applicant's invention.

FIGURE 3 illustrates an alternate embodiment of the applicant's unique accelerometer identified by reference numeral 70. Many of the component parts of accelerometer 70 are identical to those discussed with reference to accelerometer 10 in FIGURES 1 and 2. The identical component parts will be identified by the same reference numerals as utilized in FIGURES 1 and 2. The primary differences are in the housing means and the readout means.

A housing means 71 is provided which includes a generally cylindrical central member 72. Central member 72 has an external flange 73 thereon intermediate the ends thereof. Flange 73 provides a means of mounting housing means 71 and accelerometer 70 upon a vehicle or body so as to measure the acceleration thereof. Central member 72 has a cylindrical bore 74 therethrough which is symmetrical about an axis 75. Member 12 has an axial bore 76 in one end thereof. Bore 76 has a larger diameter than bore 74, has a relatively short axial extent, and is symmetrical about axis 75. Central member 72 has an annular end surface 77 thereon which lies in a plane perpendicular to axis 75. The other end of central member 72 has an axial bore 78 therein. Bore 78 is slightly larger in diameter than bore 74 and is symmetrical about axis 75. Bore 78 has a relatively short axial extent and forms a shoulder 79 near the end of central member 72.

Readout means 82 is provided within housing means 71 to sense the position of seismic mass means 40 relative to housing means 71. Readout means 82 comprise a plurality of radial readout passages through central member 72 angularly spaced about axis 75 and lying in a plane perpendicular to axis 75. Two such readout passages 83 and 84 are illustrated in FIGURE 3. The readout passages are axially positioned within central member 72 so as to communicate with cavity 35' contiguous the position of the equator of spherical seismic mass means 40 when it is supported as in its normal position as illustrated in FIGURE 3. Each of the readout passages are identical to readout passage 83 which will be described in detail. Passage 83 includes a nozzle portion 85 adjacent cavity 35'. Spaced apart from nozzle 85 is a restrictor or orifice 86 positioned within passage 83 so as to form a chamber 87 therebetween. A pressure port 88 is in communication with chamber 87. All of the other components are identical to those previously described with reference to FIGURE 1, consequently, no further description is deemed necessary.

In operation, a fluid 42' is supplied from a fluid source through connector means 28 to supply passage 27. Fluid 42' flows through porous element 23 into cavity 35' and exhausts through passage 36 so as to provide a continuous flow of fluid through cavity 35' substantially along axis 75. The continuous flow of fluid is effective to axially position seismic mass means 40 against surface 31 and to radially center it within bore 73. A high pressure fluid (not shown) is supplied to each of the plurality of readout pressure passages, such as 83, and exhausts from nozzle 85 contiguous the equator of spherical seismic mass means 40. It is clear, that movement of seismic mass means 40 relative to its normal position and relative to nozzle 85, upon acceleration of accelerometer 70 will vary the flow of fluid exhausting therefrom. Variations in flow out of nozzle 85 results in variations in pressure in chamber 87 which is sensed by pressure port 88. Thus, the pressure sensed by pressure port 88 is indicative of the position of seismic mass means 40 relative to its normal position. As supported by the continuous flow of fluid 42' through cavity 35', seismic mass means 40 is sensitive to accelerations perpendicular to axis 75. The displacement of seismic mass means 40 relative to its normal position is indicative of the applied acceleration. The pressure sensed by pressure port 88 is indicative of an acceleration applied along the longitudinal axis of passage 83. Consequently, by connecting the pressure ports of passages 83 and 84, in a differential relationship, a larger magnitude output signal is obtained which is indicative of the acceleration applied along the axis defined by pressure passages 83 and 85. As pointed out previously, by providing four readout passages at right angles to axis 75, a two axis accelerometer is obtained.

Figure 4:
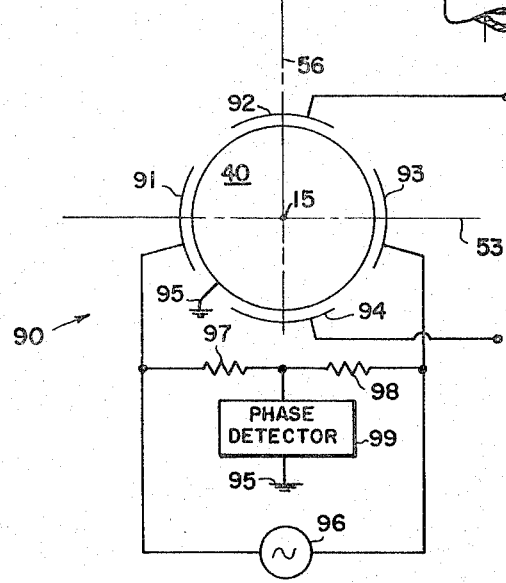
FIGURE 4 is a schematic representation of still another embodiment of the applicant's invention.

FIGURE 4 schematically illustrates an alternate readout means 90 which is an electrical type. It should be pointed out that various other pickoff means, such as optical or inductive, may be utilized in the applicant's unique accelerometer. Readout means 90 includes four spherical sector-like plates 91, 92, 93 and 94 mounted upon a housing means (not shown) and angularly spaced about axis 15 and seismic mass means 40. Plates 91, 93 are oppositely disposed from one another and positioned upon axis 53. Plates 92 and 94 are oppositely disposed from one another and positioned upon axis 56. Seismic mass means 40 cooperates with plates 91, 92, 93, 94 to form condensers of variable capacities. The capacities vary as the air gap between seismic mass means 40 and plates 91-94 varies upon an applied acceleration. Seismic mass means 40 is grounded through surface 31 and end member 30 (refer to FIGURE 1 or FIGURE 3), as at 95. Plates 91 and 93 are connected to a suitable alternating current source 96. Plate 91 and seismic mass means 40 form a condenser which in turn forms one leg of a conventional bridge circuit. Plate 93 and mass means 40 form a second leg of the bridge circuit. The bridge circuit is completed by resistors 97 and 98. A phase detector 99 is connected across the bridge and grounded as at 95. The magnitude of the phase shift sensed by phase detector 99 is indicative of the length of the air gap between seismic mass means 40 and plates 91 and 93. The direction of the phase shift sensed by phase detector 99 is indicative of the direction seismic mass means 40 is displaced. Thus the signal sensed by phase detector 99 is indicative of the magnitude and direction of the applied acceleration along axis 53. Plates 92 and 94 are connected and operate in a similar manner. Consequently, two axis information is obtained.

It is to be understood that while I have shown a specific embodiment of my invention, this is for the purpose of illustration only and that my invention is to be limited solely by the scope of the appended claims.

I claim as my invention:

1. A two axis linear accelerometer comprising: housing means, said housing means having a cavity therein symmetrical about an axis; a plane surface on said housing means perpendicular to said axis forming one end of said cavity; a fluid exhaust passage within said housing means in communication with said cavity; a fluid supply passage within said housing means in communication with said cavity; spherical seismic mass means loosely received within said cavity; means including said supply passage and said exhaust passage for providing a continuous flow of a fluid through said cavity substantially along said axis, said continuous flow of fluid being effective to axially position said seismic mass means in engagement with said plane surface, said continuous flow of fluid further being effective to radially center said seismic mass means within said cavity in a normal position relative to said housing means, said seismic mass means being displaced from said normal position upon acceleration of said housing means perpendicular to said axis; and readout means including a plurality of pressure sensing ports within said housing means perpendicular to said axis and angularly spaced thereabout, said pressure sensing ports being contiguous said seismic mass means, the pressure within each pressure sensing port being indicative of the distance between said housing means and said seismic mass means, said readout means including means for comparing the pressure within each pressure port so as to provide a signal indicative of the magnitude and direction of an applied acceleration.

2. A two axis linear accelerometer comprising: housing means, said housing means having a cavity therein symmetrical about an axis; a plane surface on said housing means perpendicular to said axis forming one end of said cavity; a fluid exhaust passage within said housing means in communication with said cavity; a fluid supply passage within said housing means in communication with said cavity; spherical seismic mass means loosely received within said cavity; means including said supply passage and said exhaust passage for providing a continuous flow of a fluid through said cavity substantially along said axis, said continuous flow of fluid being effective to axially position said seismic mass means in engagement with said plane surface, said continuous flow of fluid further being effective to radially center said seismic mass means within said cavity in a normal position relative to said housing means, said seismic mass means being displaced from said normal position upon acceleration of said housing means perpendicular to said axis; and readout means including a plurality of readout passages within said housing means perpendicular to said axis and angularly spaced thereabout, said readout passages being contiguous said seismic mass element, said readout means including means for providing fluid flow through said readout passages, the pressure within each pressure port being indicative of the distance between said housing means and said seismic mass means, said readout means including means for comparing the pressure within each readout passage so as to provide a signal indicative of the magnitude and direction of an applied acceleration.

3. A linear accelerometer comprising: housing means, said housing means having a cavity therein symmetrical about an axis; a plane surface on said housing means perpendicular to said axis forming one end of said cavity; fluid exhaust passage means within said housing means in communication with said cavity; fluid supply passage means within said housing means in communication with said cavity; spherical seismic mass means loosely received within said cavity; means including said supply passage and said exhaust passage for providing a continuous flow of a fluid through said cavity substantially along said axis, said continuous flow of fluid being effective to axially position said seismic mass means in engagement with said plane surface, said continuous flow of fluid further being effective to radially center said seismic mass means within said cavity in a normal position relative to said housing means, said seismic mass means being displaced from said normal position upon acceleration of said housing means perpendicular to said axis; and fluid readout means, said fluid readout means providing a signal indicative of the position of said seismic mass means relative to said normal position, said signal being indicative of the magnitude and direction of an applied acceleration.

4. A linear accelerometer comprising: housing means, said housing means having a cavity therein symmetrical about an axis, said cavity having a plane surface perpendicular to said axis; fluid exhaust passage means within said housing means in communication with said cavity; fluid supply passage means within said housing means in communication with said cavity; spherical seismic mass means loosely received within said cavity; means including said supply passage and said exhaust passage for providing a continuous flow of a fluid through said cavity substantially along said axis, said continuous flow of fluid being effective to axially position said seismic mass means in engagement with said plane surface, said continuous flow of fluid further being effective to radially center said seismic mass means within said cavity in a normal position relative to said housing, said seismic mass means being displaced from said normal position upon acceleration of said housing means perpendicular to said axis; and capacitive readout means, said capacitive pickoff means providing a signal indicative of the position of said seismic mass means relative to said normal position, said signal being indicative of the magnitude and direction of an applied acceleration.

5. An accelerometer comprising: housing means, said housing means having a cavity therein symmetrical about an axis, said cavity having a plane surface perpendicular to said axis; fluid exhaust passage means within said housing means in communication with said cavity; fluid supply passage means within said housing means in communication with said cavity; spherical seismic mass means loosely received within said cavity; means including said supply passage and said exhaust passage for providing a continuous flow of a fluid through said cavity substantially along said axis, said continuous flow of fluid being effective to axially position said seismic mass means in engagement with said plane surface, said continuous flow of fluid further being effective to radially center said seismic mass means within said cavity in a normal position relative to said housing means, said seismic mass means being displaced from said normal position upon acceleration of said housing means perpendicular to said axis; and readout means for providing a signal indicative of the magnitude and direction of the displacement of said seismic mass means from said normal position, said signal being indicative of the magnitude and direction of an applied acceleration.

6. An accelerometer comprising: housing means, said housing means having a cavity therein symmetrical about a first axis, said cavity having a plane surface perpendicular to said first axis; fluid exhaust passage means within said housing means in communication with said cavity; fluid supply passage means within said housing means in communication with said cavity; symmetrical seismic mass means loosely received within said cavity; means including said supply passage and said exhaust passage for providing a continuous flow of a fluid through said cavity substantially along said first axis, said continuous flow of fluid being effective to axially position said seismic mass means in engagement with said plane surface, continuous flow of fluid further being effective to radially center said seismic mass means within said cavity in a normal position whereby its axis of symmetry is coincident with said first axis, said seismic mass means being displaced from said normal position upon acceleration of said housing means perpendicular to said first axis; and readout means for providing a signal indicative of the displacement of seismic mass means relative to said normal position, said signal being indicative of the magnitude and direction of an applied acceleration.

References Cited by the Examiner
UNITED STATES PATENTS

| | | | |
|---|---|---|---|
| 2,591,921 | 4/1952 | Cosgriff et al. | 73—516 |
| 2,958,137 | 11/1960 | Muller | 73—516 |
| 3,080,761 | 3/1963 | Speen | 73—516 |

RICHARD C. QUEISSER, *Primary Examiner.*

SAMUEL FEINBERG, *Examiner.*

L. L. HALLACHER, *Assistant Examiner.*